US009485742B2

(12) United States Patent
Byun et al.

(10) Patent No.: US 9,485,742 B2
(45) Date of Patent: Nov. 1, 2016

(54) COMMUNICATION DURING THERMAL MITIGATION

(71) Applicant: Apple Inc., Cupertino, CA (US)

(72) Inventors: Kwangho Byun, Santa Clara, CA (US);
Rajesh Ambati, Santa Clara, CA (US);
Syed A. Rahim, San Jose, CA (US);
Someet K. Lal, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/738,096

(22) Filed: Jan. 10, 2013

(65) Prior Publication Data

US 2014/0194134 A1  Jul. 10, 2014

(51) Int. Cl.
*H04W 52/36* (2009.01)
*H04W 24/02* (2009.01)
*H04W 36/00* (2009.01)
*H04W 52/32* (2009.01)

(52) U.S. Cl.
CPC .......... *H04W 52/367* (2013.01); *H04W 24/02* (2013.01); *H04W 36/00* (2013.01); *H04W 52/325* (2013.01)

(58) Field of Classification Search
CPC ... H04W 52/04; H04W 52/24; H04W 52/36; H04W 52/38; H04W 52/40; H04W 52/143; H04W 52/146; H04W 52/225; H04W 52/365; H04W 24/02; H04W 36/00; H04W 36/0083; H04W 36/08; H04W 36/16; H04W 36/18; H04W 36/24; H04W 36/32; H04W 36/245; G06F 1/26; G06F 1/32; G06F 1/3203; G06F 1/3206; G06F 1/3209; G06F 1/3228

USPC .............. 455/522, 127.1, 67.11, 67.13, 63.1, 455/436–444; 713/300–340

See application file for complete search history.

(56) References Cited

U.S. PATENT DOCUMENTS

| 2006/0229073 | A1* | 10/2006 | Das et al. | 455/436 |
| 2008/0151818 | A1* | 6/2008 | Brueck et al. | 370/329 |
| 2009/0093253 | A1* | 4/2009 | Hayashi et al. | 455/436 |
| 2013/0344830 | A1* | 12/2013 | Coe et al. | 455/127.1 |
| 2014/0045543 | A1* | 2/2014 | Ishii et al. | 455/522 |

* cited by examiner

*Primary Examiner* — George Eng
*Assistant Examiner* — Umair Ahsan
(74) *Attorney, Agent, or Firm* — Blank Rome LLP

(57) ABSTRACT

In order to facilitate communication in a wireless network, an accessibility issue in the wireless network may be detected. For example, if an electronic device is near the boundary between two adjacent cells in the cellular-telephone network, the signal power of signals from a current cell or connection may decrease. Concurrently, the maximum transmit power of the electronic device may be constrained by a thermal limit of the electronic device. When this occurs, the connection may be lost unless remedial action is taken. Therefore, in response to this condition, the electronic device may temporarily increase the maximum transmit power to allow the electronic device to communicate with the cellular-telephone network so that the connection may be transitioned to another cell or connection. In this way, the communication technique may restore the communication performance and avoid a dropped call, which will improve the user experience and customer satisfaction.

23 Claims, 6 Drawing Sheets

COMMUNICATION DURING THERMAL MITIGATION

BACKGROUND

1. Field

The described embodiments relate to techniques for improving communication in wireless networks.

2. Related Art

Many electronic devices, such as cellular telephones, include a networking subsystem that is used to wirelessly communicate with other electronic devices in a cellular-telephone network. For example, these electronic devices can include a networking subsystem with a cellular-telephone network interface (UMTS, LTE, etc.).

A variety of environmental and operating conditions (which are sometimes referred to as 'circumstances') can adversely affect communication in the cellular-telephone network. For example, many electronic devices implement thermal mitigation to manage the temperature of the electronic devices, thereby ensuring that the electronic devices meet their thermal specifications under all circumstances.

One existing thermal-mitigation technique is to restrict the radio transmit power of an electronic device. In particular, when the electronic device reaches a certain temperature, the thermal-mitigation technique may be engaged and may start the mitigation process by controlling the operation of different components of the electronic device. For example, the thermal-mitigation technique may introduce a hard cap or limit on the maximum radio transmit power until the temperature of the electronic device is reduced.

However, this existing thermal-mitigation technique can adversely impact voice and data call performance. In particular, the hard cap on the radio transmit power can result in voice and data call drop under a low-coverage mobility scenario. This is illustrated in FIG. 1, which shows received signal strength and transmit power for an existing electronic device in a cellular-telephone network. At time A, cell 1 is in the active set of the electronic device and its received signal strength is sufficient to maintain the connection. Moreover, at this time, cell 2 is not added to the active set because its received signal level is not above an add threshold, and the required transmit power of the electronic device is low and, thus, is not affected by a transmit-power cap. Then, at time B, the temperature of the electronic device reaches a maximum operating-temperature threshold and a hard cap on the transmit power is applied. Subsequently, at time C, the received signal strength of cell 2 is above the add threshold and the required transmit power of the electronic device exceeds the transmit-power cap. Even though the electronic device wants to exchange a signaling message with the cellular-telephone network to add cell 2, it may not be able to do so because of the limitation imposed by the transmit-power cap. As a consequence, by time D, the received signal strength of cell 1 may degrade to the level that it will be dropped from the active set and cell 2 is still not added to the active set because of the transmit-power cap. By time E, the electronic device is not able to sustain the call and it is dropped. Such a lost connection degrades the user experience and is frustrating to users of electronic devices.

SUMMARY

The described embodiments relate to an electronic device. This electronic device includes: an antenna; an interface circuit, coupled to the antenna, which communicates in a wireless network; a processor coupled to the interface circuit; and memory that stores a program module that is executed by the processor. The program module facilitates communication in the wireless network. In particular, if a transmit power of the interface circuit is less than a first threshold value from a maximum transmit power of the interface circuit associated with a thermal limit of the electronic device, and a first signal-strength metric for a first connection between the electronic device and the wireless network is less than a second threshold value, the program module performs a remedial action. This remedial action may include: increasing the maximum transmit power by a pre-defined amount for a first pre-defined time interval; providing, to the wireless network, the first signal-strength metric for the first connection; receiving a switch-over message from the wireless network indicating that the wireless network has transitioned communication with the electronic device from the first connection to a second connection that has a second signal-strength metric which is greater than the first signal-strength metric; providing an acknowledgment message to the wireless network confirming that the communication has transitioned to the second connection; and reducing the transmit power based on the second signal-strength metric for the second connection.

Note that the wireless network may include a cellular-telephone network.

In some embodiments, after providing the acknowledgment message, the program module decreases the maximum transmit power by the pre-defined amount if an elapsed time since the increase in the maximum transmit power is less than the first pre-defined time interval.

Moreover, if, after performing the remedial action, the transmit power of the interface circuit is still less than the first threshold value from the maximum transmit power of the interface circuit, and the first signal-strength metric for the first connection is still less than the second threshold value, the program module may wait for a second pre-defined time interval, and then may repeat the remedial action. Note that the second pre-defined time interval may be larger than the first pre-defined time interval. For example, the second pre-defined time interval may be greater than or equal to 2 s.

In some embodiments, the first threshold value is less than or equal to 1 dB. Furthermore, the pre-defined amount may be greater than or equal to 4 dB and/or the first pre-defined time interval may be less than or equal to 500 ms.

Another embodiment provides a method that includes at least some of the operations performed by the electronic device.

Another embodiment provides a computer-program product for use with the electronic device. This computer-program product includes instructions for at least some of the operations performed by the electronic device.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

In order to facilitate communication in a wireless network (such as a cellular-telephone network), an accessibility issue in the wireless network may be detected. For example, if an electronic device is near the boundary between two adjacent cells in the cellular-telephone network, the signal power of signals from a current cell or connection may decrease. Concurrently, the maximum transmit power of the electronic device may be constrained by a thermal limit of the electronic device. When this occurs, the connection may be lost unless remedial action is taken. Therefore, in response to this condition, the electronic device may temporarily increase the maximum transmit power to allow the electronic device to communicate with the cellular-telephone network so that the connection may be transitioned to another cell or connection. In this way, the communication technique may restore the communication performance and avoid a dropped call, which will improve the user experience and customer satisfaction.

In the discussion that follows, a cellular-telephone network is used as an illustration of the wireless network. For example, the communication technique may be used with a communication protocol that is compatible with International Mobile Telecommunications-2000 (IMT-2000) specifications from the International Telecommunication Union of Geneva, Switzerland, or a Long Term Evolution (LTE)-compatible communication protocol (such as LTE 4G or LTE Advanced from the $3^{rd}$ Generation Partnership Project in Asia, Europe and North America). However, in other embodiments, the wireless network may include a variety of other wireless networks. In these embodiments, the communication technique may be used with a communication protocol that is compatible with: a Wi-Fi communication protocol (and, more generally, a wireless communication protocol described in the Institute of Electrical and Electronics Engineers (IEEE) standards 802.11), Bluetooth™ (from the Bluetooth Special Interests Group of Kirkland, Wash.), and/or other types of wireless interfaces.

Figure 1:
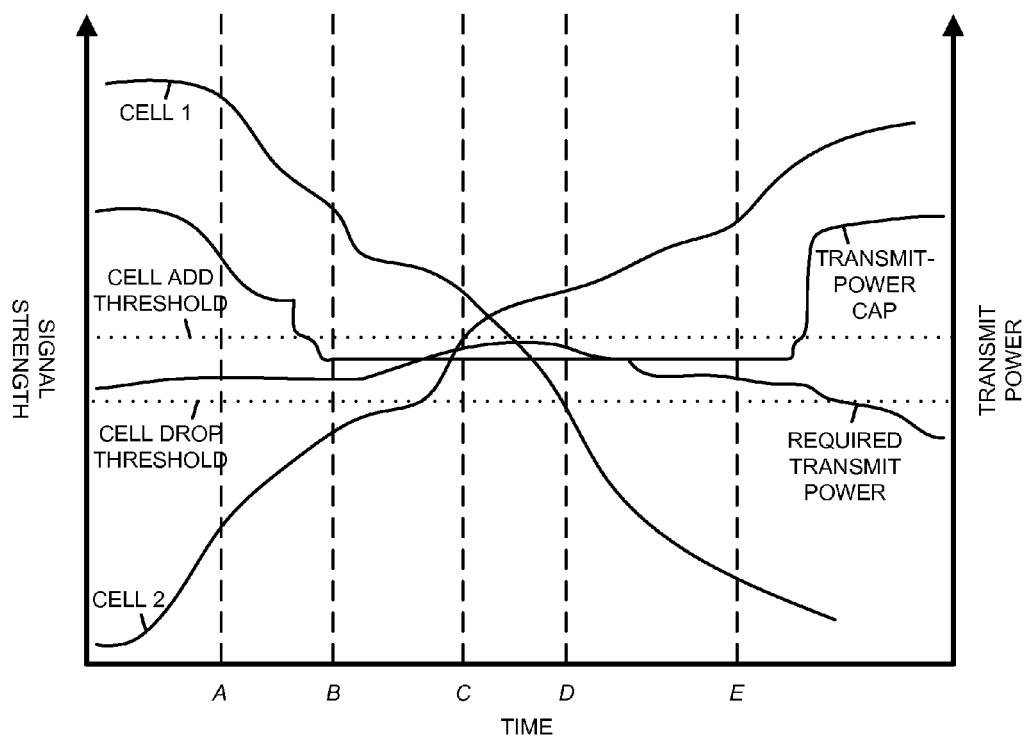
FIG. 1 is a drawing illustrating received signal strength and transmit power for an existing electronic device in a cellular-telephone network.
Figure 2:
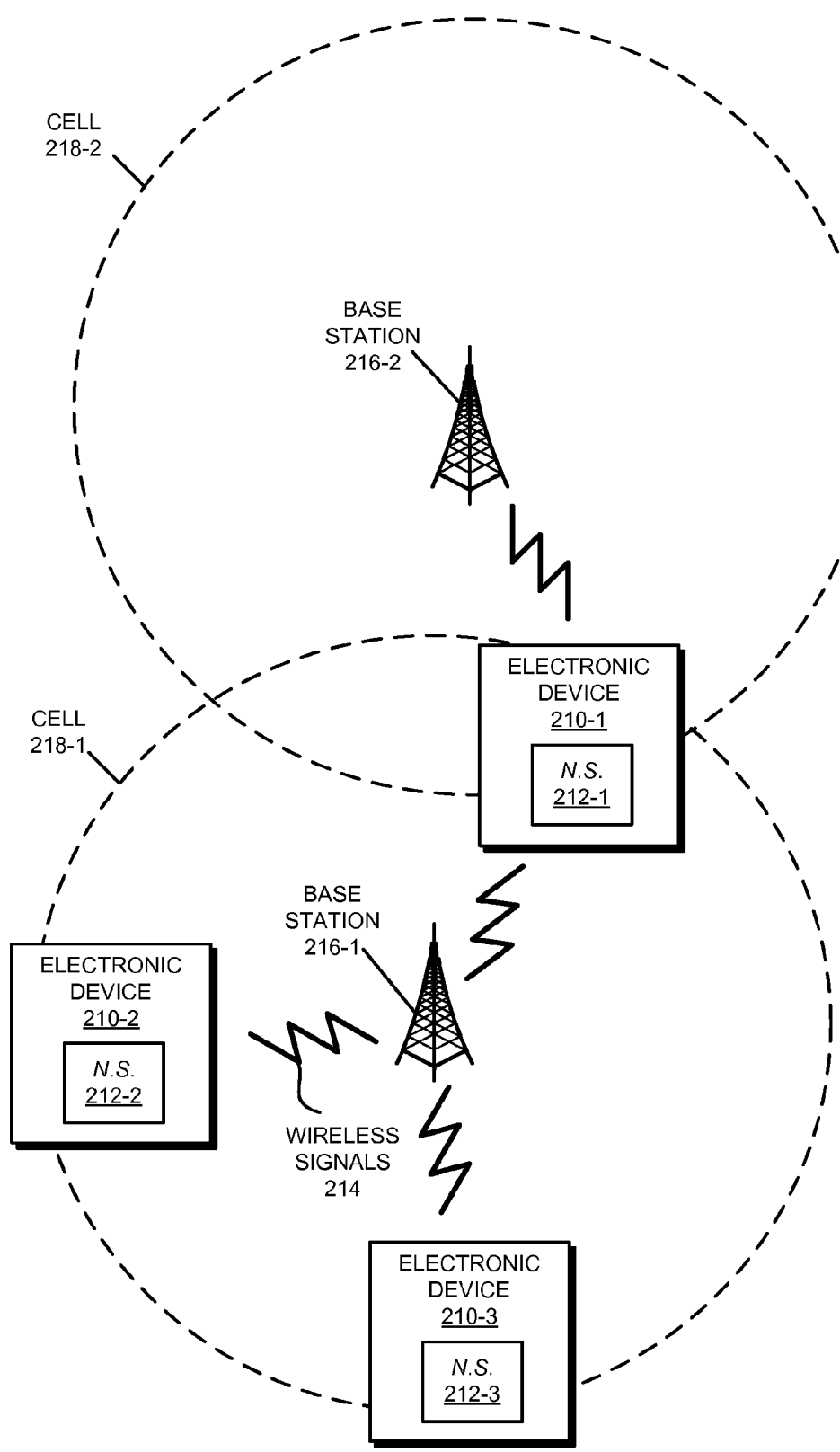
FIG. 2 is a block diagram illustrating electronic devices wirelessly communicating in a cellular-telephone network in accordance with an embodiment of the present disclosure.

The communication among electronic devices is shown in FIG. 2, which presents a block diagram illustrating electronic devices 210 which are wirelessly communicating in a cellular network. In particular, these electronic devices may wirelessly communicate while: acquiring one another by scanning wireless channels in the cellular network, transmitting and receiving frames on wireless channels, establishing connections (for example, by transmitting scheduling requests), and/or transmitting and receiving packets (which may include the commands and/or the information as payloads).

As described further below with reference to FIG. 6, each of electronic devices 210 may include subsystems, such as a networking subsystem, a memory subsystem and a processor subsystem. In addition, electronic devices 210 may include radios in networking subsystems (N.S.) 212. More generally, electronic devices 210 can include (or can be included within) any electronic devices with the networking subsystems that enable electronic devices 210 to wirelessly communicate with another electronic device. This can comprise: transmitting messages on wireless channels to enable electronic devices to make initial contact, followed by exchanging subsequent messages to establish a connection; and transmitting and receiving packets or frames via the connection, etc.

As can be seen in FIG. 2, wireless signals 214 (represented by jagged lines) are communicated with base stations 216 in cells 218 using radios in electronic devices 210.

In the described embodiments, processing a packet or frame in electronic devices 210 includes: receiving wireless signals 214 with the packet or frame; decoding/extracting the packet or frame from received wireless signals 214 to acquire the packet or frame; and processing the packet or frame to determine information contained in the packet or frame (such as the command or the information in the payload).

Although we describe the network environment shown in FIG. 2 as an example, in alternative embodiments, different numbers or types of electronic devices may be present. For example, some embodiments comprise more or fewer electronic devices. As another example, in another embodiment, different electronic devices are transmitting and/or receiving packets or frames.

A variety of scenarios may degrade the communication performance in the cellular-network telephone. In one case, one of electronic devices 210 (such as electronic device 210-1) may be stuck in a weaker cell while not being able to transition to another or a better cell. For example, as described previously, this can occur when a thermal-mitigation technique caps or limits the maximum transmit power of electronic device 210-1.

Figure 3:
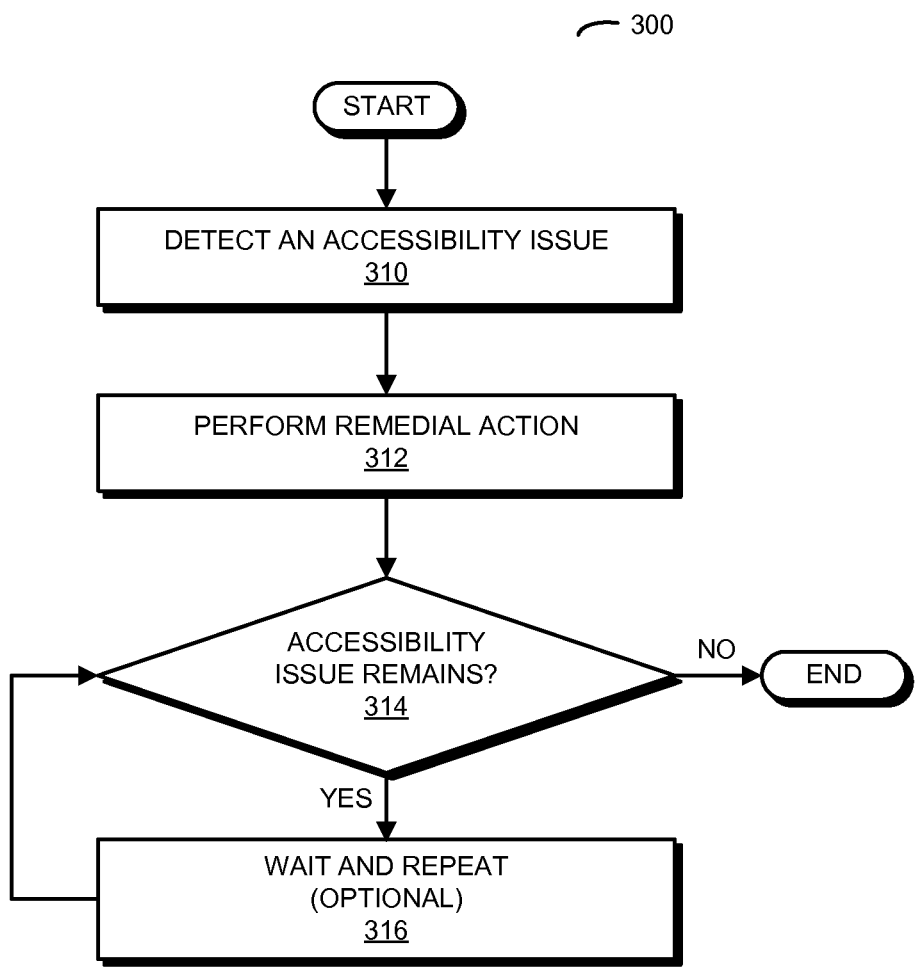
FIG. 3 is a flow diagram illustrating a method for communicating in the cellular-telephone network of FIG. 2 in accordance with an embodiment of the present disclosure.

The communication performance of the electronic device in the cellular-telephone network can be addressed using the communication technique in which a software application executing in an environment on a given one of electronic devices 210 detects an accessibility issue during communication in the cellular-telephone network, and then performs a remedial action. The communication technique is shown in FIG. 3, which presents a flow diagram illustrating a method 300 for communicating in the cellular-telephone network of FIG. 2, which may be performed by an electronic device (such as electronic device 600 in FIG. 6). During operation, the electronic device detects an accessibility issue (operation 310) during the communication in the cellular-telephone network. This accessibility issue may include a transmit power of an interface circuit in the electronic device that is less than a first threshold value from a maximum transmit power of the interface circuit associated with a thermal limit of the electronic device (such as less than or equal to 1 dB), and a first signal-strength metric for a first (current) connection between the electronic device and the cellular-telephone network being less than a second threshold value. For example, the signal-strength metric may include a received signal strength indicator or RSSI, and the second threshold value may be −100 or −110 dBm. Then, the program module performs remedial action (operation 312) to address the accessibility issue.

This remedial action may include: increasing the maximum transmit power by a pre-defined amount (such as greater than or equal to 4 dB) for a first pre-defined time interval (such as less than or equal to 500 ms); providing, to the cellular-telephone network, the first signal-strength metric for the first connection; receiving a switch-over message from the cellular-telephone network indicating that the cellular-telephone network has transitioned communication with the electronic device from the first connection to a second connection that has a second signal-strength metric which is greater than the first signal-strength metric; providing an acknowledgment message to the cellular-telephone network confirming that the communication has transitioned to the second connection; and reducing the transmit power based on the second signal-strength metric for the second connection.

In some embodiments, after providing the acknowledgment message, the program module decreases the maximum transmit power by the pre-defined amount if an elapsed time since the increase in the maximum transmit power is less than the first pre-defined time interval.

Moreover, if, after performing the remedial action, the transmit power of the interface circuit is still less than the first threshold value from the maximum transmit power of the interface circuit, and the first signal-strength metric for the first connection is still less than the second threshold value (i.e., the accessibility issue remains in operation 314), the program module may optionally wait (operation 316) for a second pre-defined time interval, and then may optionally repeat the remedial action (operation 316). Note that the second pre-defined time interval may be larger than the first pre-defined time interval. For example, the second pre-defined time interval may be greater than or equal to 2 s.

While the signal-strength metric (such as the received signal strength indicator or RSSI) is used in the preceding embodiment to illustrate detection of the accessibility issue, a variety of metrics may be used, including: another signal-strength metric (such as an averaged reference signal received power or RSRP) that is less than a third threshold value (such as −110 dBm); a signal-to-noise ratio for the communication or the connection with the current serving cell that is less than a fourth threshold value (such as 5 dB); a determined aggregate frequency error over time relative to a carrier frequency for the communication via the first connection (for example, an aggregate frequency error of more than 500 Hz over 100 ms); and/or a determined aggregate timing error over time for the communication via the first connection (such as an aggregate timing error of 10-20 µs in 200 ms). As described further below with reference to FIG. 6, these parameters may be determined or measured by networking subsystems 212 (FIG. 2).

Therefore, the communication technique may allow the user to maintain access to the cellular-telephone network with fewer dropped calls, which may reduce user frustration and improve the user experience.

In an exemplary embodiment, the communication technique is used to modify the radio transmit power when it is restricted during voice and data calls under a mobility low-coverage scenario. In particular, an electronic device may have a 53 C temperature or thermal limit. If the temperature of the electronic device is 51 C, a thermal-mitigation control loop may limit the maximum transmit power to 18 dBm. Subsequently, if the temperature does not decrease, the maximum transmit power may be decreased to 14 dBm. Then, if the temperature still does not decrease, the call or connection may be dropped.

The described communication technique may temporarily override the maximum radio transmit-power cap for a certain time-window duration when the electronic device needs extra transmit-power headroom to exchange a signaling message with the cellular-telephone network in order to sustain the call. For example, if the temperature of the electronic device is 51 C and the maximum transmit power is 18 dBm, the communication technique may allow the temperature of the electronic device to increase to 52 C with a maximum transmit power of 19 dBm for a time and, thus, may be able to save the call. (Note, however, that if the temperature of the electronic device increases to 53 C during the communication technique, the electronic device may shut down to prevent thermal damage.)

Figure 4:
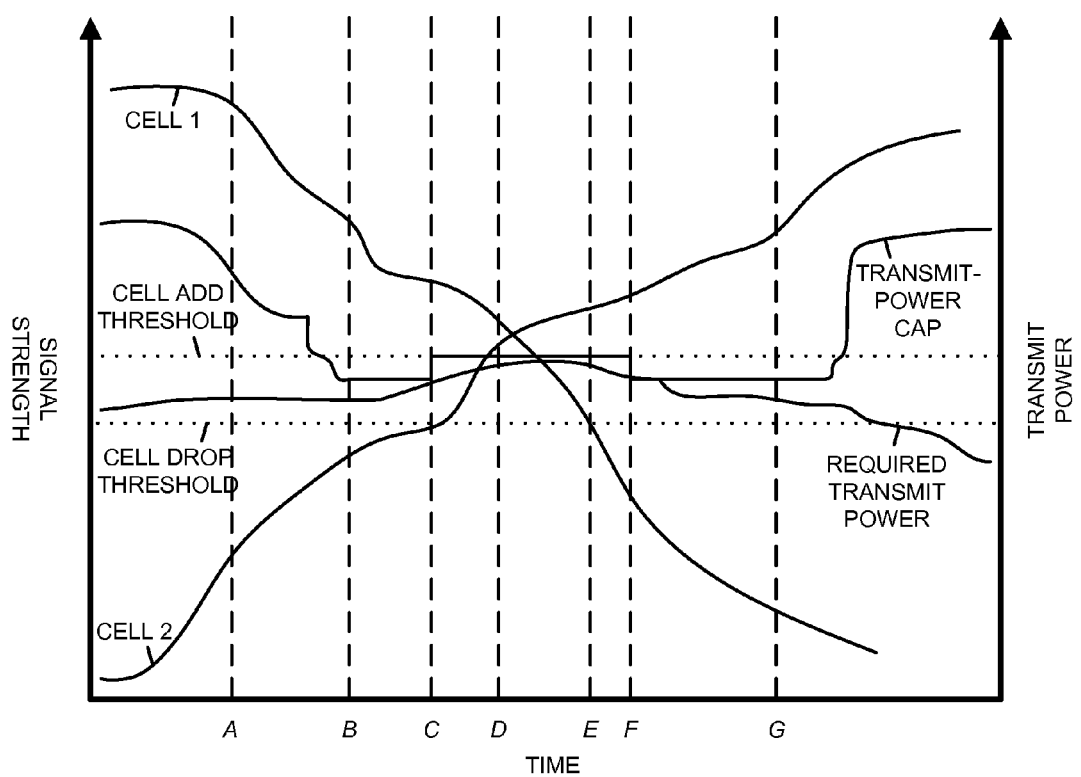
FIG. 4 is a drawing illustrating received signal strength and transmit power for an electronic device in the cellular-telephone network of FIG. 2 in accordance with an embodiment of the present disclosure.
Figure 6:
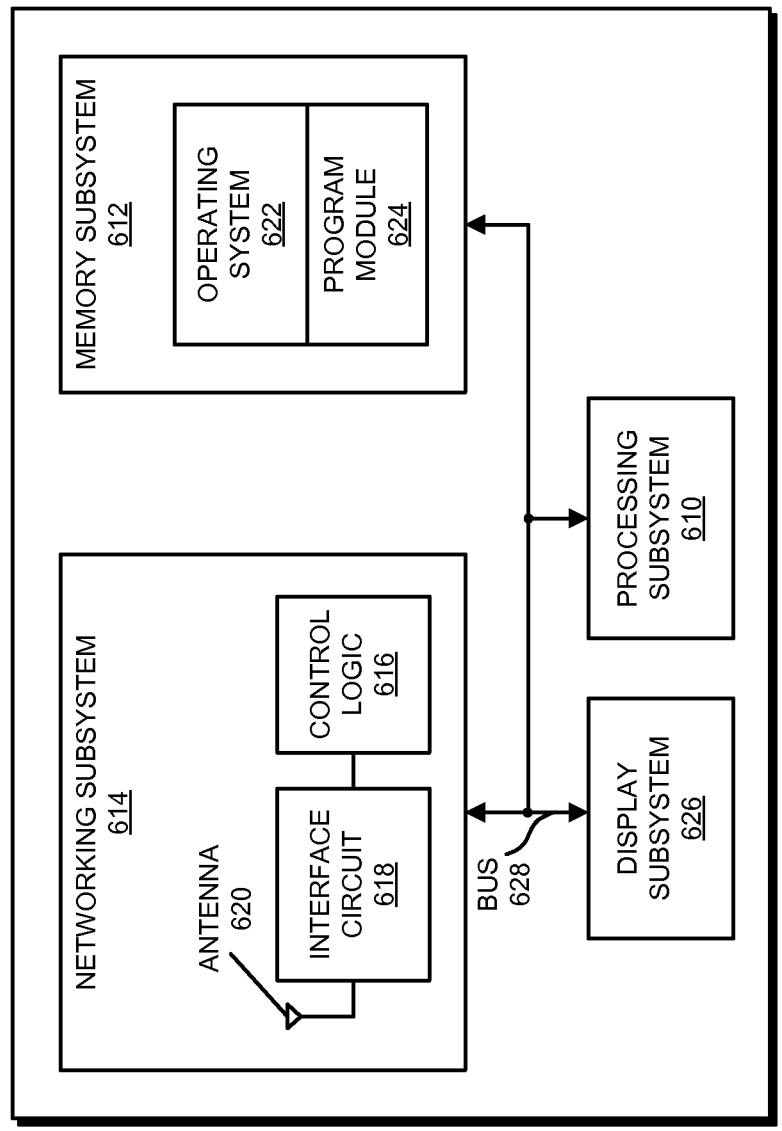
FIG. 6 is a block diagram illustrating an electronic device in accordance with an embodiment of the present disclosure.

This is illustrated in FIG. 4, which presents a drawing illustrating received signal strength and transmit power for an electronic device in the cellular-telephone network of FIG. 2, such as electronic device 210-1 (FIG. 2) or electronic device 600 (FIG. 6). At time A, cell 1 is in the active set of the electronic device and its received signal strength is sufficient to maintain the connection. Moreover, at this time, cell 2 is not added to the active set because its received signal level is not above an add threshold, and the required transmit power of the electronic device is low and, thus, is not affected by a transmit-power cap. Then, at time B, the temperature of the electronic device reaches a maximum operating-temperature threshold and a hard cap on the transmit power is applied. Subsequently, at time C, the transmit-power cap is relaxed based on the required transmit power of the electronic device so that the electronic device has extra transmit-power headroom. For example, this relaxation of the transmit-power cap may be based on the required transmit power needed to successfully send up-link packets to the cellular-telephone network. By time D, the received signal strength of cell 2 may have increased and may be above the add threshold. The electronic device may exchange a signaling message with the cellular-telephone network and may add cell 2 to the active set. Moreover, at time E, cell 1 may be removed from the active set as its received signal strength degrades. Furthermore, by time F, the received signal strength of cell 2 may increase and the required transmit power of the electronic device may decrease. Therefore, the transmit-power cap may be restored to the original limit. Thus, by time G, the electronic device was able to sustain the call.

Figure 5:
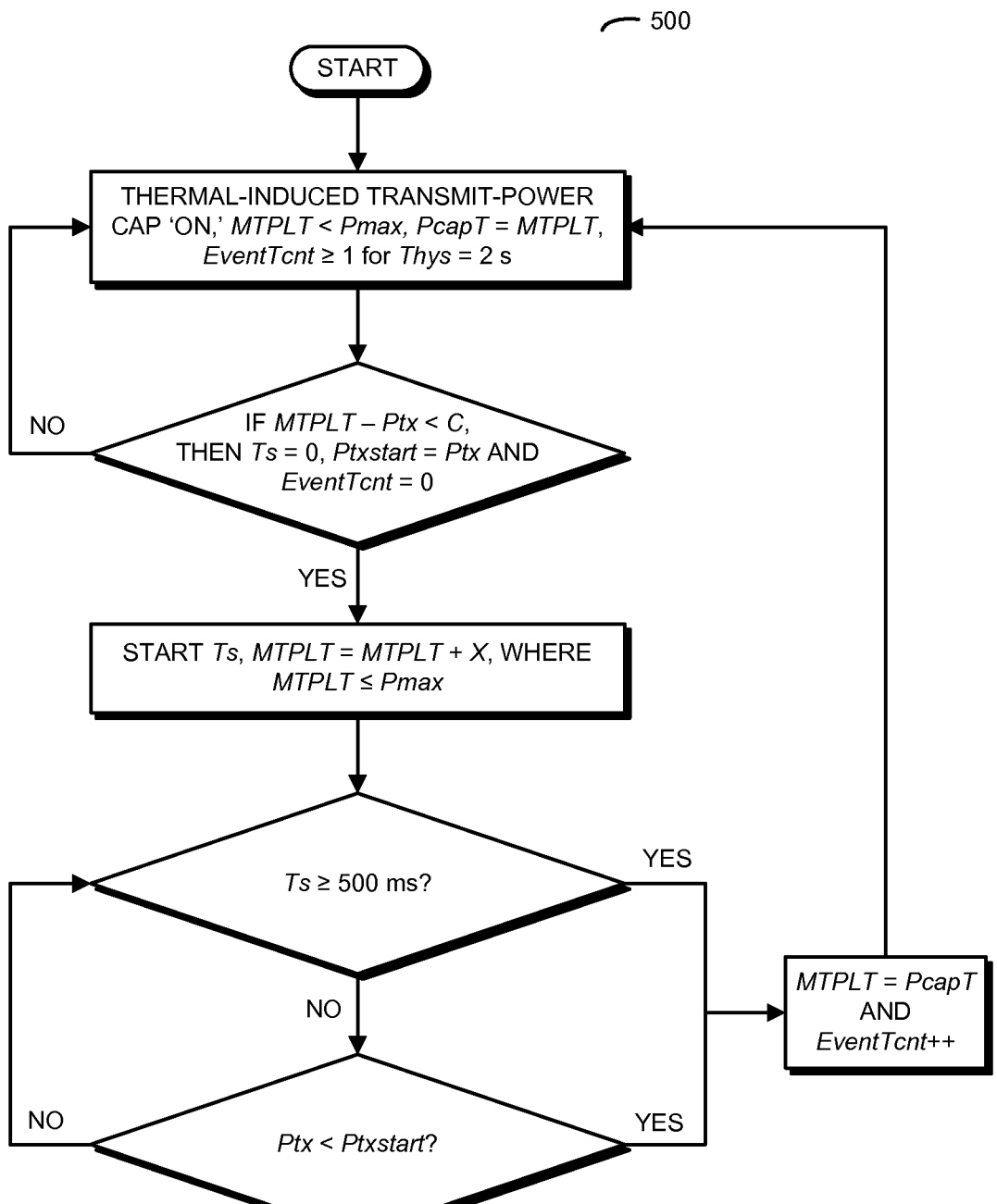
FIG. 5 is a flow diagram illustrating a method for communicating in the cellular-telephone network of FIG. 2 in accordance with an embodiment of the present disclosure.

FIG. 5 presents a flow diagram illustrating a method 500 for communicating in the cellular-telephone network of FIG. 2, which may be performed by an electronic device (such as electronic device 600 in FIG. 6). Initially, thermal-induced transmit-power capping is enabled ('ON') and the maximum transmit-power limit thermal (MTPLT) of the electronic device may be less than the maximum transmit power (Pmax) of the electronic device. Note that PcapT is variable which is assigned the MTPLT value. Moreover, if EventTcnt (a counter that keeps track of the number of events) is greater than equal to 1 and hysteresis timer (Thys) is greater than or equal to 2 s, then the communication technique is re-triggered.

If MTPLT minus the actual transmit power (Ptx) of the electronic device is less than C (a threshold, such as 0.5 dB), then MTPLT may be incremented by X (for example, X may be 4 dB). (However, MTPLT may be required to be less than or equal to Pmax.) Note that values of C and X may be based on field-log analysis in the electronic device when MTPLT is modified. In addition, a timer (Ts) and EventTcnt may be initialized to 0.

For Ts less than 500 ms (which may be based on a 100 ms communication round-trip time with the cellular-telephone network) or Ptx greater than the initial Ptx (Ptxstart) in the loop, Ptx may ramp up according to the power-up command received from the cellular-telephone network. This may allow the electronic device to send the current RSSI (for example, if the cellular-telephone network sent a cannot-hear command at a previous value of Ptx). In response, the cellular-telephone network may be able to transition the call to cell 2, and the electronic device may acknowledge the switch-over. Subsequently, the Ptx may be lowered based on the improved RSSI of cell 2 based on commands received from the cellular-telephone network. In principle, Ptx may eventually return to the level at which it started. Thus, even when there is thermal mitigation, method 500 may allow the electronic device to send a message or a packet when it is at risk of radio-link failure by temporarily relaxing MTPLT, thereby preventing a dropped voice or data call.

Note that the use of Ts in method 500 may ensure that the relaxation of the thermal-power cap is temporary to prevent thermal damage to the electronic device. Thus, for Ts greater than 500 ms, or if Ptx is less than Ptxstart, MTPLT may be restored to PcapT and EventTcnt may be incremented. If the communication-performance or accessibility problem persists, after 2 s method 500 may be repeated. This hysteresis may ensure that method 500 is not repeated if there is an instantaneous fluctuation in Ptx. Note that the value of Thys may be based on field-log analysis in the electronic device.

In some embodiments of methods 300 (FIG. 3) and/or 500, there may be additional or fewer operations. Moreover, the order of the operations may be changed, and/or two or more operations may be combined into a single operation.

We now describe embodiments of the electronic device. FIG. 6 presents a block diagram illustrating an electronic device 600. This electronic device includes processing subsystem 610, memory subsystem 612, and networking subsystem 614. Processing subsystem 610 includes one or more devices configured to perform computational operations. For example, processing subsystem 610 can include one or more microprocessors, application-specific integrated circuits (ASICs), microcontrollers, programmable-logic devices, and/or one or more digital signal processors (DSPs).

Memory subsystem 612 includes one or more devices for storing data and/or instructions for processing subsystem 610 and networking subsystem 614. For example, memory subsystem 612 can include dynamic random access memory (DRAM), static random access memory (SRAM), and/or other types of memory. In some embodiments, instructions for processing subsystem 610 in memory subsystem 612 include: one or more program modules or sets of instructions (such as program module 624), which may be executed by processing subsystem 610. Note that the one or more computer programs may constitute a computer-program mechanism. Moreover, instructions in the various modules in memory subsystem 612 may be implemented in: a high-level procedural language, an object-oriented programming language, and/or in an assembly or machine language. Furthermore, the programming language may be compiled or interpreted, e.g., configurable or configured, to be executed by processing subsystem 610. Note that program module 624 may include software and/or firmware.

In addition, memory subsystem 612 can include mechanisms for controlling access to the memory. In some embodiments, memory subsystem 612 includes a memory hierarchy that comprises one or more caches coupled to a memory in electronic device 600. In some of these embodiments, one or more of the caches is located in processing subsystem 610.

In some embodiments, memory subsystem 612 is coupled to one or more high-capacity mass-storage devices (not shown). For example, memory subsystem 612 can be coupled to a magnetic or optical drive, a solid-state drive, or another type of mass-storage device. In these embodiments, memory subsystem 612 can be used by electronic device 600 as fast-access storage for often-used data, while the mass-storage device is used to store less frequently used data.

Networking subsystem 614 includes one or more devices configured to couple to and communicate on a wired and/or wireless network (i.e., to perform network operations), including: control logic 616, an interface circuit 618 and an antenna 620. For example, networking subsystem 614 can include a Bluetooth™ networking system, a cellular networking system (e.g., a 3G/4G network such as UMTS, LTE, etc.), a universal serial bus (USB) networking system, a networking system based on the standards described in IEEE 802.11 (e.g., a Wi-Fi networking system), an Ethernet networking system, and/or another networking system.

Networking subsystem 614 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 600 may use the mechanisms in networking subsystem 614 for performing simple wireless communication between the electronic devices, e.g., transmitting advertising frames and/or scanning for advertising frames transmitted by other electronic devices.

Within electronic device 600, processing subsystem 610, memory subsystem 612, and networking subsystem 614 are coupled together using bus 628. Bus 628 may include an electrical, optical, and/or electro-optical connection that the subsystems can use to communicate commands and data among one another. Although only one bus 628 is shown for clarity, different embodiments can include a different number or configuration of electrical, optical, and/or electro-optical connections between the subsystems.

In some embodiments, electronic device 600 includes a display subsystem 626 for displaying information on a display, which may include a display driver and the display, such as a liquid-crystal display, a touchscreen, etc.

Furthermore, as described previously, program module 624 may perform the operations in any of methods 300 (FIG. 3) and/or 500 (FIG. 5), including detecting the accessibility issue and performing the remedial action. For example, thermal mitigation and/or the communication technique may be performed by one or more program modules, such as program module 624, which are executed in an environment of electronic device 600 (for example, by operating system 622).

Electronic device 600 can be (or can be included in) any electronic device with at least one network interface. For example, electronic device 600 can be (or can be included in): a desktop computer, a laptop computer, a server, a media player (such as an MP3 player), an appliance, a subnotebook/netbook, a tablet computer, a smartphone, a cellular telephone, a piece of testing equipment, a network appliance, a set-top box, a personal digital assistant (PDA), a toy, a controller, a digital signal processor, a game console, a computational engine within an appliance, a consumer-electronic device, a portable computing device, a personal organizer, and/or another electronic device.

Although specific components are used to describe electronic device 600, in alternative embodiments, different components and/or subsystems may be present in electronic device 600. For example, electronic device 600 may include one or more additional instances of processing subsystem 610, memory subsystem 612, networking subsystem 614, and/or display subsystem 626. Additionally, one or more of the subsystems may not be present in electronic device 600. Moreover, in some embodiments, electronic device 600 may include one or more additional subsystems that are not shown in FIG. 6. For example, electronic device 600 can include, but is not limited to: a power subsystem (such as a battery), a data collection subsystem, an audio and/or video subsystem, an alarm subsystem, a media processing subsystem, and/or an input/output (I/O) subsystem. Also, although separate subsystems are shown in FIG. 6, in some embodiments, some or all of a given subsystem or component can be integrated into one or more of the other subsystems or component(s) in electronic device 600. For example, program module 624 may be included in operating system 622.

Moreover, the circuits and components in electronic device 600 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 614, such as a radio. Moreover, the integrated circuit may include hardware and/or software mechanisms that are used for transmitting wireless signals from electronic device 600 and receiving signals at electronic device 600 from other electronic devices. Aside from the mechanisms herein described, radios are generally known in the art and hence are not described in detail. In general, networking subsystem 614 and/or the integrated circuit can include any number of radios. Note that the radios in multiple-radio embodiments function in a similar way to the described single-radio embodiments.

In some embodiments, networking subsystem 614 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises an advertising frame, etc.)

While communication in a cellular-telephone network was used as an illustrative example, the described embodiments of the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
   an antenna;
   an interface circuit coupled to the antenna, the interface circuit configured to communicate in a wireless network;
   a processor coupled to the interface circuit, the processor configured to:
      detect a communication issue in the wireless network, based on determining that an actual transmit power of the interface circuit is less than a first threshold value from a transmit-power cap of the interface circuit and that a first signal-strength metric for a first connection between the electronic device and the wireless network is less than a second threshold value, and
      perform a remedial action, wherein the remedial action comprises:
         increasing the transmit-power cap by a pre-defined amount for a first pre-defined time interval without causing the electronic device to exceed a temperature limit
         providing, to the wireless network, the first signal-strength metric for the first connection;
         receiving a switch-over message from the wireless network indicating that the wireless network has transitioned the communication with the electronic device from the first connection to a second connection that has a second signal-strength metric which is greater than the first signal-strength metric;
         providing an acknowledgment message to the wireless network confirming that the communication has transitioned to the second connection; and
         reducing the actual transmit power based on the second signal-strength metric for the second connection.

2. The electronic device of claim 1, wherein the wireless network comprises a cellular-telephone network.

3. The electronic device of claim 1, wherein, after providing the acknowledgment message, the remedial action further comprises decreasing the transmit-power cap by the pre-defined amount if an elapsed time since the increase in the transmit-power cap is less than the first pre-defined time interval.

4. The electronic device of claim 1, wherein, if, after performing the remedial action, the actual transmit power of the interface circuit remains less than the first threshold value from the transmit-power cap of the interface circuit, and the second signal-strength metric for the second connection is still less than the second threshold value, the remedial action further comprises:

waiting for a second pre-defined time interval; and
repeating the remedial action.

5. The electronic device of claim 4, wherein the second pre-defined time interval is larger than the first pre-defined time interval.

6. The electronic device of claim 4, wherein the second pre-defined time interval is greater than or equal to 2 seconds.

7. The electronic device of claim 1, wherein the first threshold value is less than or equal to 1 decibels (dB).

8. The electronic device of claim 1, wherein the pre-defined amount is greater than or equal to 4 dB.

9. The electronic device of claim 1, wherein the first pre-defined time interval is less than or equal to 500 milliseconds.

10. The electronic device of claim 1, wherein the transmit power cap is increased incrementally by an equal amount.

11. A non-transitory computer-readable medium storing instructions that, when executed by an electronic device, cause the electronic device to:
   detect an accessibility issue of communication of an electronic device in a wireless network, based on determining that an actual transmit power of an interface circuit is less than a first threshold value from a transmit-power cap of the interface circuit and that a first signal-strength metric for a first connection between the electronic device and the wireless network is less than a second threshold value, and
   perform a remedial action, wherein the remedial action comprises:
      increasing the transmit-power cap by a pre-defined amount for a first pre-defined time interval without causing the electronic device to exceed a temperature limit;
      providing, to the wireless network, the first signal-strength metric for the first connection;
      receiving a switch-over message from the wireless network indicating that the wireless network has transitioned the communication with the electronic device from the first connection to a second connection that has a second signal-strength metric which is greater than the first signal-strength metric;
      providing an acknowledgment message to the wireless network confirming that the communication has transitioned to the second connection; and
      reducing the actual transmit power based on the second signal-strength metric for the second connection.

12. The non-transitory computer-readable medium of claim 11, wherein the wireless network comprises a cellular-telephone network.

13. The non-transitory computer-readable medium of claim 11, wherein, after providing the acknowledgment message, the remedial action further comprises decreasing the transmit-power cap by the pre-defined amount if an elapsed time since the increase in the transmit-power cap is less than the first pre-defined time interval.

14. The non-transitory computer-readable medium of claim 11, wherein, if, after performing the remedial action, the actual transmit power of the interface circuit is still less than the first threshold value from the transmit-power cap of the interface circuit, and the second signal-strength metric for the second connection is still less than the second threshold value, the remedial action further comprises:
   waiting for a second pre-defined time interval; and
   repeating the remedial action.

15. The non-transitory computer-readable medium of claim 14, wherein the second pre-defined time interval is larger than the first pre-defined time interval.

16. The non-transitory computer-readable medium of claim 14, wherein the second pre-defined time interval is greater than or equal to 2 seconds.

17. The non-transitory computer-readable medium of claim 11, wherein the first threshold value is less than or equal to 1 decibels (dB); and wherein the pre-defined amount is greater than or equal to 4 dB.

18. The non-transitory computer-readable medium of claim 11, wherein the first pre-defined time interval is less than or equal to 500 milliseconds.

19. The non-transitory computer-readable medium of claim 11, wherein the transmit power cap is increased incrementally by an equal amount.

20. An method for improving communication in a wireless network, wherein the method comprises:
   detecting an accessibility issue of communication of an electronic device in a wireless network, based on determining that an actual transmit power of an interface circuit is less than a first threshold value from a transmit-power cap of the interface circuit and that a first signal-strength metric for a first connection between the electronic device and the wireless network is less than a second threshold value, and
   perform a remedial action, wherein the remedial action comprises:
      increasing the transmit-power cap by a pre-defined amount for a first pre-defined time interval without causing the electronic device to exceed a temperature limit;
      providing, to the wireless network, the first signal-strength metric for the first connection;
      receiving a switch-over message from the wireless network indicating that the wireless network has transitioned the communication with the electronic device from the first connection to a second connection that has a second signal-strength metric which is greater than the first signal-strength metric;
      providing an acknowledgment message to the wireless network confirming that the communication has transitioned to the second connection; and
      reducing the actual transmit power based on the second signal-strength metric for the second connection.

21. The method of claim 20, wherein the wireless network comprises a cellular-telephone network.

22. The method of claim 20, wherein, if, after performing the remedial action, the actual transmit power of the interface circuit is still less than the first threshold value from the transmit-power cap of the interface circuit, and the first signal-strength metric for the first connection is still less than the second threshold value, the method further comprises:
   waiting for a second pre-defined time interval; and
   repeating the remedial action.

23. The method of claim 20, wherein the transmit power cap is increased incrementally by an equal amount.

* * * * *